United States Patent [19]
Morse

[11] Patent Number: 6,115,526
[45] Date of Patent: Sep. 5, 2000

[54] ULTRA HIGH NUMERICAL APERTURE HIGH POWER OPTICAL FIBER LASER

[75] Inventor: Theodore F Morse, Providence, R.I.

[73] Assignee: Brown University Research Foundation, Providence, R.I.

[21] Appl. No.: 09/041,919

[22] Filed: Mar. 13, 1998

Related U.S. Application Data

[60] Provisional application No. 60/041,716, Mar. 27, 1997.

[51] Int. Cl.⁷ ................................................. G02B 6/02
[52] U.S. Cl. ..................................... 385/125; 359/173
[58] Field of Search ............................. 385/123, 37, 14, 385/129, 130; 359/161, 173, 332, 566, 573, 900; 372/25, 6, 102; 250/227.18; 356/32

[56] References Cited

U.S. PATENT DOCUMENTS

| | | | |
|---|---|---|---|
| 5,319,435 | 6/1994 | Melle et al. | 250/227.18 |
| 5,367,588 | 11/1994 | Hill et al. | 385/14 |
| 5,841,797 | 11/1998 | Ventrudo et al. | 372/6 |

*Primary Examiner*—Akm E. Ullah
*Attorney, Agent, or Firm*—Ohlandt, Greeley, Ruggiero & Perle, LLP

[57] ABSTRACT

An optical fiber structure includes: an optical fiber comprising a rare earth doped core (that may be single mode or multi-mode), or several single mode cores, surrounded by a silica material; a glass cylinder tube containing the optical fiber along a length thereof such that the doped core is located at a center of the glass cylinder for a single core, or arranged geometrically around the center for multiple cores; and a support structure disposed between the light guiding section of the optical fiber optical fiber and an inner wall of the tube that functions as a portion of the support structure of the light guiding portion of the optical fiber. The support structure is arranged such that the effective cladding of the core is a gas contained between the optical fiber and the inner wall of the tube for providing the optical fiber with a numerical aperture that is approximately one. A polarization maintaining embodiment is described, as are methods for fabricating the optical fiber structures. To reduce the overall length of the fiber, a chirped Bragg grating may be written into a multi-mode section of the fiber. The optical fiber structures can be used as gain elements in optical fiber lasers, such as those having applications in communications, medical, and manufacturing environments.

27 Claims, 2 Drawing Sheets

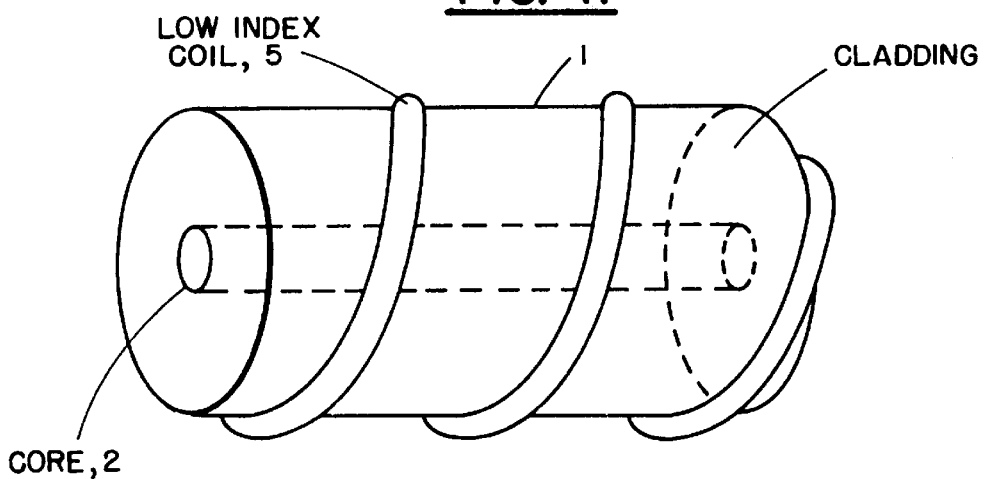
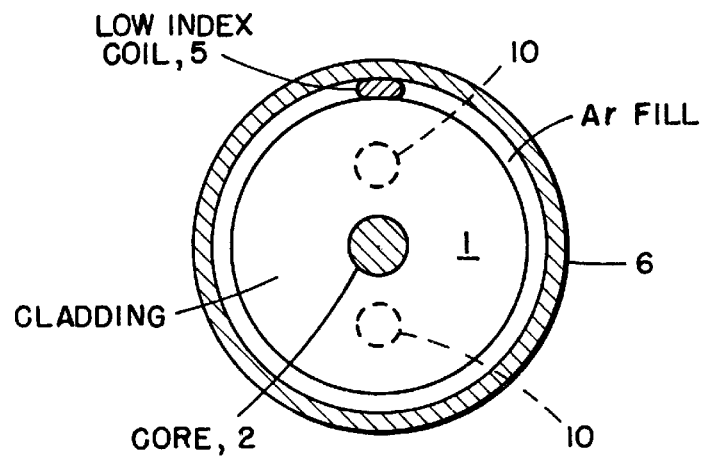
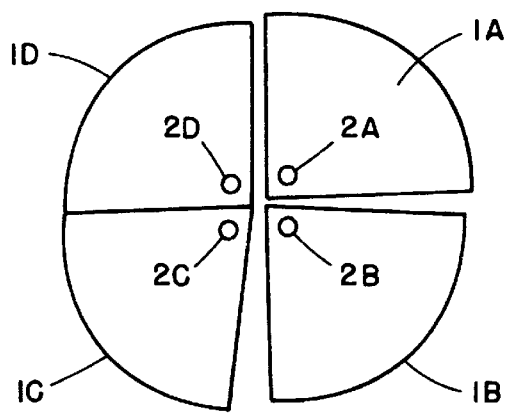
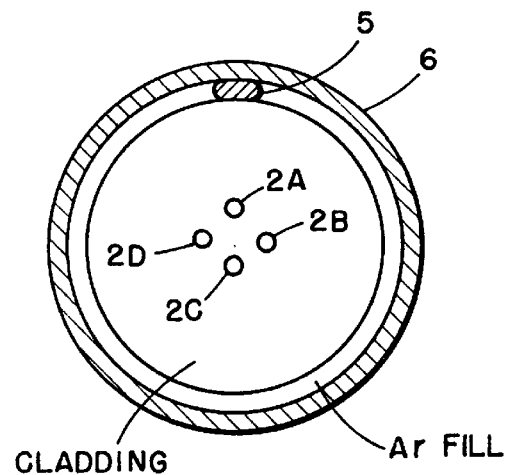

ULTRA HIGH NUMERICAL APERTURE HIGH POWER OPTICAL FIBER LASER

CLAIM OF PRIORITY FROM A COPENDING PROVISIONAL PATENT APPLICATION

Priority is herewith claimed under 35 U.S.C. §119(e) from copending Provisional Patent Application Ser. No. 60/041,716, filed Mar. 27, 1997, entitled "Ultra High Numerical Aperture High Power Optical Fiber Laser", by Theodore F. Morse. The disclosure of this Provisional Patent Application is incorporated by reference herein in its entirety.

STATEMENT OF GOVERNMENT RIGHTS

This invention was made with government support under grant number 49620-96-1-0083 awarded by the United States Air Force Office of Scientific Research. The government has certain rights in this invention.

FIELD OF THE INVENTION

This invention relates generally to solid state laser devices and, in particular, to optical fiber lasers.

BACKGROUND OF THE INVENTION

High power optical fiber lasers are becoming of increasing interest as a consequence of the efficiency, lower cost, and availability of arrays of diode pump lasers. Such arrays of diode pump lasers can have an output power approaching 100 W or greater, and serve as an ideal pump source for optical fiber lasers.

The purpose of the optical fiber laser is two fold. First, the output from a diode array is highly multi-mode, and thus, there is a limiting factor to the brightness. There are many situations in which the beam quality of a single mode fiber with less power is more desirable than a higher powered multi-mode array. These applications can include materials processing, surgery, sources for high power communications between satellites, as well as applications in terrestrial communications systems. A second reason is that the fiber laser can transform the wavelength of the diode array to a different wavelength regime, preferably one that is not currently available to high power diodes. An output emission in the "eye safe" region beyond 1.5 microns would fall into this category. Also, and with specific reference to surgical applications, a fiber laser operating at 1.95 microns has two orders of magnitude higher water absorption, and thus a higher interactivity with tissue, than does a diode array operating at either 800 nm or 980 nm.

When the energy from a diode array is focused into a fiber laser, if the laser is single mode, there will be, at best, inefficient coupling into the fiber core. Much of the energy will be present in the form of skew, or helical rays that merely circle the axis of the fiber where the core is located. If, however, this symmetry is broken by placing the core off-center, or if a slab geometry with one axis of the slab longer than the other, it will be possible for these rays to intersect the core as they travel along the fiber. In the case of the slab geometry, an outer coating of a low index of refraction plastic can cover the slab. The combination then functions as a multi-mode structure that guides the high energy of the pump light from the diode array. Also, some diode arrays are configured as rectangles, which provides a suitable geometry for coupling into the multi-mode rectangle in the fiber. A known type of laser constructed in accordance with this approach may be referred to as a "double clad" optical fiber laser.

One of the disadvantages of present double-clad optical fibers is that the outer coating is a polymer. While this coating material has been shown to be suitable to permit single mode operation (CW) at a level of 50 W in a ytterbium fiber laser, it is clear that as power demands increase a polymeric coating will not be adequate. This is true at least for the reason that any interaction of the high power laser diode pump source with the polymeric cladding or coating layer will destroy the laser.

Also, the lowest index of refraction polymer that is presently available is approximately 1.35. This implies that the numerical aperture of the fiber is limited to less than 0.5. The numerical aperture of the fiber laser is a measure of the acceptance angle for the pump light, and the higher the number, the easier it is to couple the high energy pump source into the fiber. By example, space communications applications require as high a numerical aperture as possible and, for reasons of long term reliability, an all-glass fiber laser.

Diode bar arrays are now commercially available, and can be arranged to produce power levels in the many tens of Watts. The power is delivered through multi-mode fibers, or arrays of fibers bundled together. However, a fiber having a low numerical aperture will not efficiently accept the radiation of these devices in such a manner that single mode laser radiation will result, as would occur by having the pump radiation from the diode array serve as the energy source to create an inversion in a rare earth doped optical fiber laser. Since single mode operation is desired for high brightness, with a core typically 5–10 microns in diameter, it is not possible to focus the light from the fiberized output of the diode array into the single mode core. The brightness theorem specifies that the numerical aperture of the fibers coming from the diode source, times the fiber area, must be a constant. Thus, the high intensity light from the fiberized output of the diode array cannot be focused into the core of a single mode fiber.

In order to circumvent this restriction, and as was alluded to above, it known that a fiber preform can be ground into a rectangle with the core in the center. The preform is pulled with a low index polymer as a coating, which serves to confine light focused into the rectangular region. As the light proceeds down this rectangular section of the fiber, it bounces back and forth, and is absorbed by the core of the fiber. This creates an inversion in the core, which is single mode, and is an indirect technique for avoiding the restriction of the brightness theorem which states, as noted above, that the product of area times numerical aperture (for the source and fiber receiving radiation) must remain constant.

A distinct disadvantage of this type of cladding pumped fiber is that the outer cladding which confines the light in the rectangular area is a soft plastic. If any of the high intensity light interacts with this material, it will instantly be degraded. Also, in space applications, or if one desires to deposit or sputter an anti-reflecting coating on the fiber end, the soft plastic material will significantly outgas.

Nevertheless, these fibers are playing an increasingly important role in telecommunications, space applications, and materials processing.

In light of the above discussion, a consideration is now made of an alternate approach that has led to an all glass, higher numerical aperture fiber. First, however, reference is made to early work done at Bell Laboratories on optical fibers by Kaiser et al. In this work, which predated any of the now commonly used techniques for the fabrication of optical fibers, it was realized that an index difference was necessary to obtain guiding in a glass fiber. The solution that was arrived at, since at that time there were no suitable techniques for preform fabrication, was that of an "airplane" fiber. In this fiber, a quartz slide was placed in a quartz tube, and a rod was placed along the quartz slide. Effectively, the numerical aperture of this device was high, because the quartz core was surrounded by air. After a fiber was drawn the losses were such that transmission over a hundred meters was obtained.

OBJECTS AND ADVANTAGES OF THE INVENTION

It is a first object and advantage of this invention to provide an improved optical fiber, suitable for use in an optical fiber laser, that overcomes the foregoing and other problems.

It is another object and advantage of this invention to provide an optical fiber laser having a high numerical aperture and that does not rely on the use of polymeric cladding materials.

It is another object and advantage of this invention to provide an optical fiber laser having a high numerical aperture and that does not rely on the use of conventional glass slide and glass rod techniques.

SUMMARY OF THE INVENTION

The foregoing and other problems are overcome and the objects and advantages are realized by methods and apparatus in accordance with embodiments of this invention.

Disclosed herein is an optical fiber structure that includes: an optical fiber comprising a rare earth doped core (that may be single mode or multi-mode), or several single mode cores, surrounded by a silica material; a glass cylinder tube containing the optical fiber along a length thereof such that the doped core is located at a center of the glass cylinder for a single core, or arranged geometrically around the center for multiple cores; and a support structure disposed between the light guiding section of the optical fiber optical fiber and an inner wall of the tube that functions as a portion of the support structure of the light guiding portion of the optical fiber. The support structure is arranged such that the effective cladding of the core is a gas contained between the optical fiber and the inner wall of the tube for providing the optical fiber with a numerical aperture that is approximately one.

In one embodiment the support structure is formed of a plurality of portions of the silica material that extend away from said core as one or more cross arms. The cross arms are obtained by machining an optical fiber preform. In this embodiment the inside of the support tube is "down doped" with an appropriate index reducing oxide.

In another embodiment the support structure is formed from a lower index of refraction glass filament or strip that is helically wrapped around the core doped section of the preform. This structure is then surrounded by a quartz substrate tube.

A polarization maintaining embodiment of this invention is also described, as are methods for fabricating the optical fiber structures. The optical fiber structures can be used as gain elements in optical fiber lasers, such as those having applications in communications, medical, and manufacturing environments.

To reduce the overall length of the fiber, a chirped Bragg grating may be written into the multi-mode section of the fiber, inside of which is contained a single mode rare earth doped fiber. If the grating is written into a germanium doped cladding at the pump wavelength, the grating serves as a mirror that effectively halves the needed absorption length. If the multi-mode structure of the total cladding is doped with, for example, Yb, then 100% reflecting Bragg chirped mirrors written at the Yb wavelength confine the lasing operation between these mirrors and effectively reduce the needed length of the cladding pumped fiber significantly.

BRIEF DESCRIPTION OF THE DRAWINGS

The above set forth and other features of the invention are made more apparent in the ensuing Detailed Description of the Invention when read in conjunction with the attached Drawings, wherein:

FIG. 7 is a perspective view of a helically wrapped preform in accordance with a further embodiment of this invention.

FIG. 8 is cross-sectional view of an optical fiber structure that is pulled from the helically wrapped preform of FIG. 7.

FIGS. 9A and 9B depict a multiple core embodiment of this invention.

DETAILED DESCRIPTION OF THE INVENTION

Figure 1:
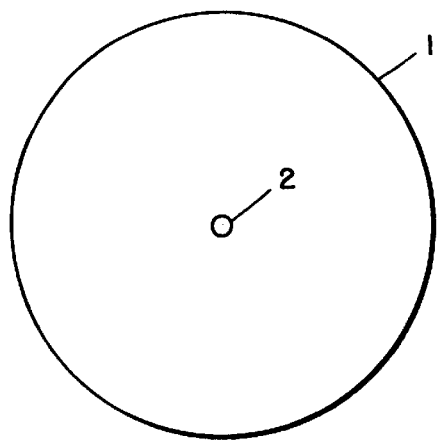
FIG. 1 is an enlarged cross-sectional view of an optical fiber preform with a rare earth doped core.

FIG. 1 is an enlarged cross-sectional view of a silica optical fiber preform 1 with a rare earth doped core 2. The preform 1, with a diameter typically in the range of about 20 mm to 30 mm, itself may be doped throughout by using a rare earth doped substrate tube. This embodiment is of importance for, by example, a Yb—Er co-doped fiber laser. Even without a rare earth doped substrate tube, a thin silica substrate tube can be used, and using a chemical vapor deposition process such as MCVD, a multi-mode rare earth doped guiding structure can be formed, for example Yb, and within the core of this structure a single mode core either singly doped with Er, for example, or with Er— Yb can be formed. If a chirped Bragg grating is written in the outer structure, lasing would occur in the Yb, which would pump the Er in the core. This can result in significantly shorter cladding type fiber lasers, as described in further detail below.

Suitable rare earth dopants include Erbium, Thulium, Ytterbium, combinations of Er, Tm and/or Yb, and, in general, any of the rare earths. The use of Tm was considered for the following reason. Tm, which is known can lase between 1650 nm and 2009 nm in a silica host, has a fluorescence peak near 1840 nm, depending upon detailed doping of the host. There is a water absorption peak at 1942 nm, which makes Tm a candidate for doping a fiber for medical applications, since radiation absorption in tissue is mainly determined by water absorption.

It is noted that Tm can be affected by photo-darkening as a consequence of multi-photon effects. This deleterious photo-darkening can be significantly reduced by the introduction of dopants that absorb at some small multiple (in energy) of the pump wavelength. That is, if four photons are associated with damaging photo-darkening, then an absorber at the level of three photons will prevent the Tm from being raised to the level at which photo-darkening occurs.

Figure 2:
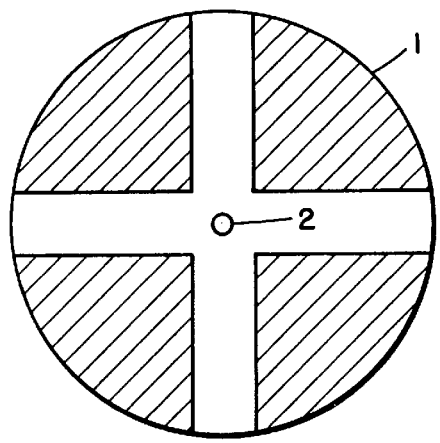
FIG. 2 depicts the optical fiber preform of FIG. 1 and illustrates the machining of the shaded areas to leave a cross-form glass structure that contains the core. The axes of the cross-form glass need not be at 90 degrees to one another.
Figure 3:
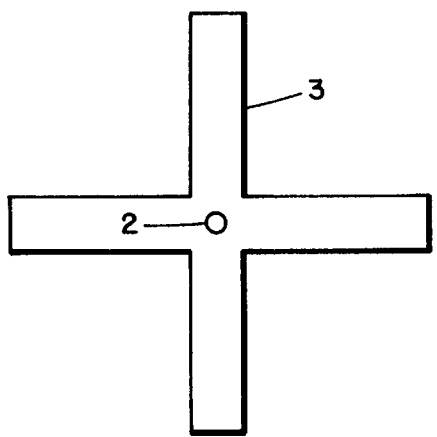
FIG. 3 illustrates the cross-form glass preform with doped core after the machining step of FIG. 2.

In FIG. 2 the preform 1 is machined so as to remove the shaded areas. This can readily be done with precision machining techniques, such as a milling operation. The result of the machining process is the formation of a cross-shaped glass structure 3 that contains the centrally located doped core 2, as is illustrated in FIG. 3. It is not necessary that the two arms of the "cross" be at right angles to one another.

Figure 4:
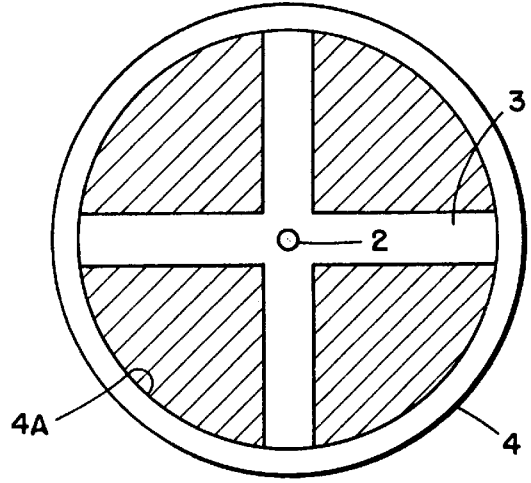
FIG. 4 depicts the cross-form glass preform of FIG. 3 located within a down doped substrate tube.

As is illustrated in FIG. 4, a next step takes the cross-shaped fiber preform structure 3 and places it in a substrate tube 4 whose inner diameter has been machined (and preferably optically polished) to accommodate the cross-shaped fiber preform structure 3. The machined preform 1 is then fused to the tube 4, the resulting structure is then fused onto appropriate handles, and is pulled into an optical fiber using known techniques. The outside diameter of the resultant optical fiber structure is, typically, between 300 and 1000 microns. The substrate tube 4 could have deposited on the inside surface one or more "down doped" layers 4A comprised of boron or fluorine. Down doping refers to the introduction of atoms into the glass whose function is to lower the index of refraction when compared with that of silica. The final structure of the optical fiber is essentially identical to that of the preform 1 illustrated in FIG. 4, although reduced significantly in diameter. The area between the cross-shaped fiber preform structure 3 and the down doped layers 4A is preferably filled with air or an inert gas such as argon. As such, the effective cladding of the multi-mode section of the core 2 is a gas, such that a numerical aperture that is equal to or approaching unity may be obtained.

A consideration will now be made as to how induced stress may be used to obtain a polarization maintaining cladding pumped fiber in the case of the above described double cross arm embodiment.

Figure 5:
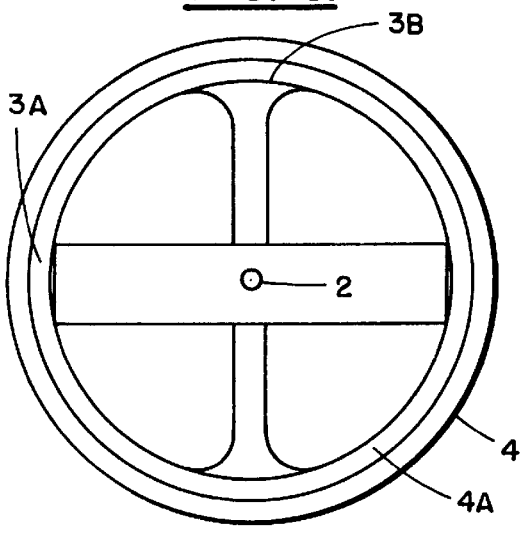
FIG. 5 illustrates in greater detail the configuration described in FIG. 4, in accordance with a first embodiment of this invention, and shows a high power, high numerical aperture optical fiber laser with a single web.

More particularly, FIG. 5 illustrates a technique to fabricate a high numerical aperture optical fiber 10 that is polarization maintaining. In order to achieve this effect in a conventional fiber it is known that stress-induced birefringence is employed.

In accordance with this aspect of the invention the cross-shaped structure 3 is machined such that the web or cross-sectional area of the two cross arms are different (e.g., one cross arm has dimensions of 100×300 microns while the other has dimensions of 150×300 microns), but the area at the points of attachment (3A, 3B) to the tube 4 is substantially identical for both arms. If the inner section 4A of the substrate tube 4 is down doped appropriately with boron, for example, the following will occur as the fiber is pulled. Since the down-doped region 4A will have a lower glass transition temperature than the high content silica of the cross structure 3 or the substrate tube 4, these elements will solidify first leaving a lower viscosity contact between the cross structure 3 and the substrate tube 4. The radius of the fiber at this point is thus fixed. As the down doped region 4A cools, its thermal expansion coefficient is higher than that of the quartz regions, and a tensile stress will be imparted as a consequence of the mismatch of thermal expansion between the down-doped region 4A and the surrounding quartz regions. If the attachment areas 3A and 3B of both arms of the cross structure 3 are the same then, as a consequence of a smaller cross-section in one arm of the cross structure 3, there will exist a higher stress. Consequently, the index of refraction of the core will be different along the two axes of the cross structure 3. With proper attention to the thickness of the down doped region 4A, and the different thicknesses of the webs or cross arms, the optical propagation constants in the two directions will be different, as is the case of a polarization maintaining fiber.

Figure 6:
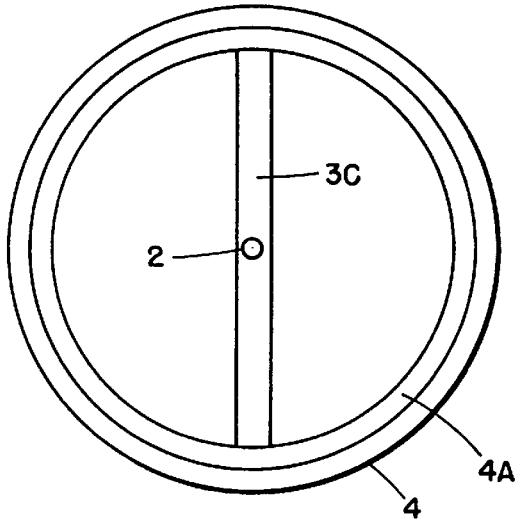
FIG. 6 illustrates, in accordance with a second embodiment of this invention, a high power, high numerical aperture optical fiber laser with a single web.

A second, somewhat simpler embodiment is illustrated in FIG. 6. In this embodiment a machined slab of preform 3C that includes the centrally located doped core 2 (i.e., the core 2 is collinear with the longitudinal axis of the preform), is placed within the quartz tube 4, with the appropriate down doping layer(s) 4A formed on the inner surface of the tube 4. Again, an advantage of such a structure is the stabilization of the flat preform 3C during fiber draw, such that a larger aspect ratio of the machined preform 3C may be maintained. Also, as previously described, the effective cladding of the multi-mode section of the core is a gas, so that a numerical aperture approaching unity may be obtained.

While the embodiment of FIG. 5 shows the use of four extending support arms, and the embodiment of FIG. 6 the use of two extending support arms, it should be realized that three extending arms could be employed as well.

These embodiments of the invention provide a number of advantages over the prior art. A first advantage in that an all glass structure may be readily obtained, thus permitting an extension to even higher pump powers and, associated with this, higher laser output powers. A second advantage is realized by a consideration of the fact that the cladding of the fiber can be a gas with a refractive index of 1.0, resulting in a large increase in the NA (Numerical Aperture) of the optical fiber. For example, considering silica as the multi-mode guiding structure with an index of refraction of 1.458, the NA for the resulting structure exceeds 1, where 1 is the limiting asymptotic value for the acceptance angle. This represents an enormous improvement in the ease with which pump light can be coupled into the cross formed guiding structure 3.

By virtue of the fact that there are a multiplicity of guiding structures (two in the case illustrated in FIG. 5), the amount of absorbed pump light can be increased without exceeding structural damage limitations. That is, since the area for pump absorption increases the pump energy into the fiber can increase proportionally.

Bragg gratings have been employed in the core of a cladding pumped optical fiber in order to obtain more efficient lasing action. In accordance with an aspect of this invention a consideration is now made of two modifications that reduce the length of the cladding pumped fiber laser. First, consider the situation in which a multi-mode structure is deposited within a thin walled tube and in which a grating may be written. Inside this structure a core is deposited. Both the multi-mode and the single mode structure have a sufficient amount of Ge incorporated so that a grating may be written. A conventional technique, using for example a phase mask and UV illumination, can be used to write the grating. The grating that is written in the multi-mode structure could be at the pump wavelength, and, for an end-pumped configuration, the grating is placed at the exit end of the fiber. This grating is preferably "chirped", i.e., it covers the full wavelength spectrum of the multi-mode core. The pump light is thus reflected back from the end, thereby eliminating the need to pump from both ends and effectively reducing by one half the length of the optical fiber laser. In a further embodiment there is deposited a lasing rare earth, such as Yb, in the large multi-mode core. Gratings are then written such that the Yb would lase, with the gratings acting as dichroic mirrors with respect to the pump, and the lasing radiation is confined between these two mirrors. This embodiment thus significantly shortens the cladding pumped configuration. By using doped substrate tubes that contained either germanium and/or rare earth doping, the entire structure rather than just the deposited multi-mode region may participate in this process.

A further advantage that is obtained by the use of this invention relates to the overall geometry of the structure. More particularly, there are difficulties present in pulling a cladding type optical fiber from a preform with a length to width ratio that exceeds approximately 4–5. In this case instabilities and twisting occur, and it is difficult to maintain the fiber such that it is centered in the polymeric coating. In accordance with the teachings of this invention this problem is avoided by virtue of the fact that the outer coating of the fiber, which does not interact with the light traveling in the fiber, is a cylindrical structure. This may be accomplished with only one section of machined preform as indicated in FIG. 6.

Another advantage is in the ability to obtain a polarization maintaining cladding pumped optical fiber. This may be achieved as described above and illustrated in FIG. 5. Such an arrangement may be of importance for sum and frequency difference applications.

Finally, it should be noted that although the foregoing embodiments have been described in the context of an optical fiber structure wherein the external cladding is silica (i.e., the tube 4), it is within the scope of the teaching of this invention to employ rare earth doped, low loss substrate tubes such that the multi-mode cladding can function as a fiber laser.

Further now in accordance with this invention a structure is described that is more stable and more readily drawn than the conventional "airplane" fiber referred to above, and which furthermore is comprised of all glass and has a high numerical aperture.

Referring to FIG. 7, to obtain this embodiment of the high numerical aperture fiber one starts with the fiber preform 1 having the core 2, and then "wraps" the preform 1 with a low index of refraction glass rod or strip 5 in a helical or "candy cane" configuration. The glass strip material 5 can be obtained from "canes" pulled down from a Heraeus step index preform, and may have a diameter of about 1 mm to 2 mm. The strip 5 may also be comprised of a low index fluorine doped silica material. In practice, the strip 5 is wrapped around the preform 1 with a predetermined pitch of the order of, for example, 2 mm, and the structure is then heated to a temperature of about 1750° C. to fuse the glass strip 5 to the preform outer surface. The glass strip 5 can typically have a numerical aperture of 0.24 with respect to the silica. The resulting "candy cane" configuration is then sleeved with an outer quartz tube 6 and, after pulling the fiber, the result is shown end-on in FIG. 8. Note that the glass strip 5 serves to separate and isolate the preform 1 from the surrounding tube 6, and the intervening space can contain air or an inert gas. As the preform/strip combination is heated and pulled into an optical fiber the pitch of the glass strip helix (typically about 2 mm on the preform 1) increases and uncoils as the fiber is pulled. The resulting pitch in the pulled optical fiber may be of the order of a meter, and the outer diameter of the resulting pulled fiber may typically be of the order of 475 microns, although it can be pulled to larger or smaller diameters. The bend radii are such that the fiber can be conveniently coiled. The lower index of refraction strip 5 that supports the lasing part of the preform 1 is elliptical in shape, as would be expected from the conic section of a circle, and it attaches the lasing section of the fiber to the outer substrate tube 6. The inner area is filled with air or an inert gas, such as Ar, and, except for the area of contact with the supporting section, the resulting numerical aperture of the fiber is 1.0. That is, it has the ability to gather in light arriving from any angle. The critical angle of light acceptance thus becomes 90 degrees.

When used in an optical fiber laser the lasing section of the fiber is preferably end pumped from a suitable pumping source, such as the above mentioned diode array, although it is within the scope of the teachings of this invention to pump the optical fiber laser from the side, assuming that the surrounding tube is transparent to the pump wavelength.

This process permits the fabrication of a fiber with a NA that is effectively 1.0, since the cladding that is pumped is surrounded by a gas (e.g., dry air or argon). For example, the preform is filled with dry Ar during the draw process to minimize the effects of OH contamination.

A coating can be placed on the outside of the resulting pulled fiber. This can be a "hard" acrylic coating that will not outgas in the manner of the softer, low numerical aperture coatings that are presently used in cladding pumped fibers, thereby enabling the resulting optical fiber laser to be used in low pressure applications, such as in space or in vacuum deposition chambers, without experiencing the deleterious effects of polymer outgassing. The coating may be any one of many commercially available acrylate materials used in the fiber optic industry to obtain a hard, durable coating.

It was found that a simple hand cleaving operation was able to consistently provide a uniform cleave, and that polishing was not necessary.

The cylindrical symmetry of the lasing section of the fiber shown in FIG. 8 suggests a manner in which a polarizing maintaining fiber may be obtained with the helically wrapped configuration. More particularly, if, in the preform before wrapping with the rod 5, holes are bored adjacent to the core and fire polished, glass rods 10 (shown in dashed outline in FIG. 8) of a higher expansion coefficient may be inserted into these holes. When the fiber is pulled, the thermal expansion mismatch will induce high stresses. This insures that the stress induced refractive indices parallel and perpendicular to an axis joining the center of these holes will be significantly different. This structure can then be pulled into the optical fiber in a manner illustrated in FIG. 8, and the resulting cladding pumped configuration is polarization maintaining.

In order to increase the pump capture efficiency, multiple single mode lasing cores may included. Referring to FIGS. 9A and 9B, four preforms 1 are cut into pie shaped wedges 1A–1D each containing a respective core 2A–2D. The wedges 1A–1D are then fitted together, as in FIG. 9A, wrapped with the rod 5, inserted into the glass tube 6, and then the assembly is heated and pulled into an optical fiber as described previously. The resulting optical fiber structure, shown in FIG. 9B, contains the four multi-mode cores 2A–2D that are arranged geometrically around the center axis. The four cores 2A–2D provide a higher brightness than would a four moded multi-mode core.

While the invention has been particularly shown and described with respect to preferred embodiments thereof, it will be understood by those skilled in the art that changes in form and details may be made therein without departing from the scope and spirit of the invention.

What is claimed is:

1. An optical fiber structure, comprising:
   an optical fiber comprising a rare earth doped core surrounded by a silica material;
   a tube containing said optical fiber along a length thereof such that said doped core is located at a center of said tube; and
   a support structure disposed between said optical fiber and an inner wall of said tube, said support structure being arranged such that an effective cladding of said core is a gas contained between said optical fiber and said inner wall of said tube for providing said optical fiber with a numerical aperture that is approximately one.

2. An optical fiber structure as in claim 1, wherein said support structure is comprised of a plurality of portions of said silica material that extend away from said core.

3. An optical fiber structure as in claim 1, wherein said support structure is comprised of a glass strip that is wrapped around said optical fiber.

4. An optical fiber structure as in claim 3, wherein said glass strip has a lower index of refraction than the silica material of said optical fiber.

5. An optical fiber structure as in claim 1, and further comprising a coating disposed over an outer surface of said tube.

6. An optical fiber structure as in claim 5, wherein said coating is comprised of an acrylic material.

7. An optical fiber structure as in claim 1, wherein said support structure is comprised of at least two cross arms of said silica material that extend away from said core, wherein a cross-sectional area of the two cross arms are different, wherein an area at points of attachment of the cross arms to the inner surface of said tube are approximately equal, wherein a tensile stress exists within said tube, and wherein as a consequence of a smaller cross-sectional area in one cross arm there exists a higher stress such that the index of refraction of the core is different along the axes of the cross arms for inducing a difference in the optical propagation constants in said core.

8. An optical fiber structure as in claim 7, wherein said inner surface of said tube is a surface of a region having a glass transition temperature that differs from a glass transition temperature of the remainder of said tube.

9. An optical fiber structure as in claim 1, and further comprising means for selectively inducing a stress in cladding surrounding said core for making optical propagation through said optical fiber to be polarization maintaining.

10. An optical fiber structure as in claim 9, wherein said means for selectively inducing a stress is comprised of glass rods inserted into said silica material in a direction parallel to said core.

11. An optical fiber structure as in claim 10, wherein said support structure is comprised of a glass strip that is wrapped around said optical fiber, said glass strip having a lower index of refraction than the silica material of said optical fiber.

12. An optical fiber structure as in claim 9, wherein said support structure is comprised of a plurality of portions of said silica material that extend away from said core, and wherein said means for selectively inducing a stress is comprised of predetermined ones of said portions having differing areas.

13. A gain element for an optical fiber laser, comprising:
   an optical fiber comprising a rare earth doped core surrounded by a silica material;
   a tube containing said optical fiber along a length thereof such that said doped core is located at a center of said tube; and
   a support structure disposed between said optical fiber and an inner wall of said tube, said support structure being arranged such that an effective cladding of said core is a gas contained between said optical fiber and said inner wall of said tube for providing said optical fiber with a numerical aperture that is approximately one, wherein said support structure is comprised of a glass strip that is helically wrapped around said optical fiber.

14. A gain element for an optical fiber laser as in claim 13, wherein said glass strip has a lower index of refraction than the silica material of said optical fiber.

15. A gain element for an optical fiber laser as in claim 13, and further comprising at least one grating that is optically coupled to said optical fiber.

16. A method for fabricating an optical fiber structure, comprising steps of:
   providing an optical fiber preform comprising a rare earth doped core surrounded by a silica material;
   forming a support structure upon or within an outer surface of said preform;
   inserting the preform into a tube such that the support structure supports the core from an inner wall of the tube; and
   drawing an optical fiber from the preform and tube, wherein in the optical fiber an effective cladding of the core is a gas contained between the drawn preform and the inner wall of the tube for providing the core with a numerical aperture that is approximately one.

17. A method as in claim 16, wherein the step of forming a support structure includes a step of machining the preform to provide a plurality of portions of the silica material that extend away from the core.

18. A method as in claim 16, wherein the step of forming a support structure includes a step of wrapping a glass strip in a helical fashion around the preform, and joining the glass strip to the preform.

19. A method as in claim 18, wherein the glass strip has a lower index of refraction than the silica material of the preform.

20. A method as in claim 16, and further comprising a step of applying a coating that is disposed over an outer surface of the optical fiber.

21. A method as in claim 20, wherein the coating is comprised of an acrylic material selected for having a low amount of outgassing in a low atmospheric pressure environment.

22. A method as in claim 16, wherein the step of drawing includes a step of selectively inducing a stress in cladding surrounding the core for causing optical propagation through the optical fiber to be polarization maintaining.

23. A method as in claim 16, wherein the inner surface of said tube is a surface of a region having a glass transition temperature that differs from a glass transition temperature of the remainder of the tube, and wherein the step of forming the support structure includes a step of removing material from the preform to form at least two cross arms of the silica material that extend away from the core, wherein a cross-sectional area of the two cross arms are different, and wherein an area at points of attachment of the cross arms to the inner surface of the tube are approximately equal, the step of forming further including a step of heating the preform and tube such that a tensile stress exists within the tube, and wherein as a consequence of a smaller cross-sectional area in one cross arm there exists a higher stress such that the index of refraction of the core is different along the axes of the cross arms for inducing a difference in the optical propagation constants in the core.

24. A gain element for an optical fiber laser, comprising:

an optical fiber comprising a plurality of rare earth doped cores surrounded by a silica material;

a tube containing said optical fiber along a length thereof; and a support structure disposed between said optical fiber and an inner wall of said tube, said support structure being arranged such that an effective cladding of said core is a gas contained between said optical fiber and said inner wall of said tube for providing said optical fiber with a numerical aperture that is approximately one.

25. A gain element for an optical fiber laser as in claim 24, wherein said support structure is comprised of a glass strip that is helically wrapped around said optical fiber.

26. A gain element for an optical fiber laser as in claim 25, wherein said glass strip has a lower index of refraction than the silica material of said optical fiber.

27. A gain element for an optical fiber laser as in claim 24, and further comprising at least one grating that is optically coupled to said optical fiber.

* * * * *